US006977787B2

(12) United States Patent  (10) Patent No.: US 6,977,787 B2
Ito  (45) Date of Patent: Dec. 20, 2005

(54) READ PROCESSING METHOD OF STORAGE MEDIUM, STORAGE APPARATUS, DATA REPRODUCTION METHOD, DATA REPRODUCTION SYSTEM AND STORAGE MEDIUM THEREFOR

(75) Inventor: Masahiro Ito, Higashine (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/153,069

(22) Filed: May 21, 2002

(65) Prior Publication Data

US 2002/0144186 A1  Oct. 3, 2002

Related U.S. Application Data

(63) Continuation of application No. PCT/JP99/06594, filed on Nov. 25, 1999.

(51) Int. Cl.[7] .............................................. G11B 5/09
(52) U.S. Cl. ......................................... 360/53; 360/31
(58) Field of Search .............................. 360/53, 54, 31

(56) References Cited

U.S. PATENT DOCUMENTS

| | | | | |
|---|---|---|---|---|
| 5,241,546 A | * | 8/1993 | Peterson et al. | ............. 714/761 |
| 5,588,012 A | * | 12/1996 | Oizumi | ........................ 714/805 |
| 6,084,734 A | * | 7/2000 | Southerland et al. | ......... 360/53 |
| 6,327,391 B1 | * | 12/2001 | Ohnishi et al. | .............. 382/236 |
| 6,519,715 B1 | * | 2/2003 | Takashi et al. | ................ 714/32 |
| 2002/0114397 A1 | * | 8/2002 | Todo et al. | ............. 375/240.29 |

FOREIGN PATENT DOCUMENTS

| | | |
|---|---|---|
| JP | 1-300475 | 12/1989 |
| JP | 3-076059 | 4/1991 |
| JP | 3-116586 | 5/1991 |
| JP | 3-288359 | 12/1991 |
| JP | 5-040583 | 2/1993 |
| JP | 5-274808 | 10/1993 |
| JP | 7-272414 | 10/1995 |
| JP | 9-223367 | 8/1997 |
| JP | 10-172236 | 6/1998 |
| JP | 11-144381 | 5/1999 |

* cited by examiner

Primary Examiner—David Hudspeth
Assistant Examiner—Varsha A. Kapadia
(74) Attorney, Agent, or Firm—Greer, Burns & Crain, Ltd.

(57) ABSTRACT

A read processing method and a reproduction system for continuously reading out an audio/visual data from a storage medium. When a data cannot be read out from storage medium, a data having a predetermined pattern is transferred so as to prevent operational deadlock caused by an error data even when the audio/visual data is transferred continuously. This method enables to allow to transfer audio/visual data continuously. Also, an application for reproducing data enables to identify an error, enabling to avoid the application falling into a non-executable condition or the system falling into a hung-up condition. In addition, because whether a retry is needed is determined when error data is transferred, it becomes possible to avoid an unnecessary retry in reproducing audio/visual or the like.

9 Claims, 10 Drawing Sheets

_US 6,977,787 B2_

READ PROCESSING METHOD OF STORAGE MEDIUM, STORAGE APPARATUS, DATA REPRODUCTION METHOD, DATA REPRODUCTION SYSTEM AND STORAGE MEDIUM THEREFOR

This is a continuation of International PCT Application No. PCT/JP99/06594 filed Nov. 25, 1999.

FIELD OF THE INVENTION

The present invention relates to read processing method for reading AV (audio/visual) data from a storage medium, storage apparatus, data reproduction method, data reproduction system, and storage medium therefor, and more particularly read processing method of storage medium for reading audio/visual data requiring continuity, storage apparatus, data reproduction method, data reproduction system, and storage medium therefore.

BACKGROUND OF THE INVENTION

With the advance of digital technology in recent years, apparatus handling AV (audio/visual) data is increasing. Handling of such AV data is also required in computers. AV data includes image data and audio data generally consisting of a large data amount. By employing data compression method such as the MPEG in order to reduce data amount, and employing a large capacity storage medium, it is possible to handle such AV digital data in writing and reading to/from a storage medium.

As such storage media, DVD (digital video disk), MO (magneto-optical disk), hard disk, semiconductor memory, and VTR tape (videotape) are currently in use. When reading AV data from such storage media, readout error may possibly occur in a read block during the readout of data blocks. This is caused by either degraded performance of the drive head or a defect of the storage medium. In addition, for example when the data are being downloaded, an error data may be stored without correction because audio/visual data is transferred continuously, which may also cause a read data error afterwards.

In respect of computer data, which includes program data and file data, a program is no more correctly executable in the event of a failure in such data. Therefore, on detection of a data error, retry processing is carried out without transferring of error data.

Meanwhile, in respect of AV data including image data and/or audio data, it is required to continue to record and read such data so as not to interrupt. In other words, it is not preferable to suspend data transfer even if a data error occurs.

As a measure against the aforementioned problem to be applied in computer storage apparatus, there has been proposed a method for continuing data transfer in the read processing of AV data, instead of interrupting, without detecting a data error (for example, in the official gazette of Japanese Unexamined Patent Publication No. Hei-11-144381). This method is based on that audio/visual data, produces no significant influence to the reproduced images even when errors occurred in a few blocks, because AV data is utilized as image reproduction etc.

There has also been disclosed for VTR reproduction apparatus having data compression capability, in which error correction is performed against AV data being read from a video tape (for example, in the official gazette of Japanese Unexamined Patent Publication No. Hei-5-274808, and Hei-7-272414). With regard to an error data block to which the error correction is not possible, the data is replaced by a pseudo data to output to data expansion (decompression) circuit, thereby degradation in the image quality is avoided.

In the above-mentioned methods, either a data having suffered an error or a pseudo data is transferred without modification so that continuous reproduction is possible for AV data requiring continuity of images or voices.

However, when such processing for reproducing AV data is executed by software (an application program) being employed in a system, it is not possible to apply such art straightly. Because such an application program processes the compressed data directly, it is not possible to reproduce when the application receives a data which was unexpected. This may produce to fail in normal application operation or the system may even be hung up.

In other words, error data may sometimes result in producing an unexpected data for the application, and thus producing a failure in normal application operation. Further, because the aforementioned pseudo data is constructed by a data to decrease image deterioration after being expanded by an expansion (decompression) circuit, it becomes difficult for the application to identify the error. This raises a problem that a more desirable reproduction processing such as skipping or interpolation is not applicable.

Furthermore, the aforementioned methods are the methods for error handling against a data failure when the data can be read out successfully from a storage medium. On the other hand, when a whole block data cannot be read out from a storage medium at all, the readout processing is interrupted. This impedes continuous readout of the audio/visual data. There are cases that dust or vibration, for example, on a magneto-optical disk may cause such a failure in reading out a block, producing the interruption against the continuous data readout.

Secondly, according to such conventional arts, reproduction processing is carried out straightly against such an error data or a pseudo data. Therefore, when the application writes the AV data including the error to read out the application possibly writes error AV data into another recording medium (for example, memory card), into such a storage medium.

To cope with this problem, it is to be considered to introduce a retry control against an error block so as not to process the error data, as having been applied in storage apparatus of a computer system mentioned earlier. For example, one known method is that, in a disk unit having an alternate sector to be substituted for an error sector, an error sector location is memorized while data blocks are continuously read out for one command. Each sector data (including error data) is transferred for the command, and thereafter the data in the alternate sector is read out to transfer to a host (for example, as disclosed in the official gazette of Japanese Unexamined Patent Publication No. Hei-1-300475).

According to this method, the data are continuously transferred, as is required for AV data. However, the data transferred to a host is a clean data in which an error has been excluded by means of a retry operation, because this operation is that the object data is a program data in this case. Accordingly, even when the reproduction is being carried out in the host (application), the retry is performed regularly and thus clean data is transferred in any case. However, once the reproduction is performed, the clean data being received after the reproduction becomes of no use. Instead, this merely results in an increased load in the application of the host.

Accordingly, it is an object of the present invention to provide a method for read processing of a storage medium, enabling an application to identify an error and to perform an appropriate reproduction processing even when AV data are transferred continuously from a storage medium, and to provide its storage apparatus, data reproduction method, data reproduction system, and a storage medium.

It is another object of the present invention to provide a method for read processing of a storage medium to transfer AV data continuously even when the data cannot be read out from a storage medium at all, and to provide its storage apparatus, data reproduction method, data reproduction system, and a storage medium.

It is another object of the present invention to provide a method for read processing of a storage medium, enabling an application to obtain a clean data when necessary even when AV data including an error is transferred, and to provide its storage apparatus, data reproduction method, data reproduction system, and a storage medium.

SUMMARY OF THE INVENTION

According to one feature of the present invention, there is provided a read processing method for reading out data in a plurality of blocks of a storage medium. The method includes the step of reading out data stored in the storage medium, the step of determining whether a readout error occurs during the readout, and the step of generating a predetermined data pattern to output in place of the block data of interest when the readout error occurs, so that an application for reproducing the readout data can identify the error.

According to the above feature, when a readout error occurs, a predetermined data pattern is generated to output in place of the block data of interest, so that an application for reproducing the readout data can identify the error. Accordingly, the application can identify the error, which enables to prevent a failure in executing normal operation of the application, and also to prevent a hung up of the system. Further, because the application can identify the error, it becomes possible to continue the reproduction processing using a more preferable reproduction method, instead of reproducing using the pseudo data. Thus AV data reproduction performance can be improved.

According to another feature of the present invention, the above-mentioned determination step of error occurrence further includes the step of determining whether the data readout is successfully completed. In this feature, a predetermined pattern is output even in case no data can be read out at all from the storage medium. Therefore, even in the case no data can be read out, interruption of AV data can be avoided.

According to still another feature of the present invention, the method includes the steps of; reading out data stored in the storage medium; generating a predetermined data pattern to transfer in place of the block data of interest when the readout error occurs; and performing reproduction processing against the transferred data. Here, the above-mentioned reproduction processing step identifies an error from the predetermined data pattern, and continues the reproduction processing.

In this feature, when a readout error occurs, a predetermined data pattern is generated to output in place of the block data of interest, so that reproduction processing identifies the error from the predetermined data pattern. Accordingly, the application can identify the error, which enables to prevent a failure in executing normal operation of the application, and also to prevent a hung up of the system. Further, because the application can identify the error, it becomes possible to continue the reproduction processing using a more preferable reproduction method, instead of reproducing using the pseudo data. Thus AV data reproduction performance can be improved.

According to another feature of the present invention, there is provided storage apparatus which includes a readout unit for reading out data in the storage medium, and a processing unit for determining the readout error and, when the readout error is detected, generating a predetermined data pattern which enables an application for reproducing the readout data to identify the readout error, and outputting in place of the block data of interest.

In this feature, when a readout error is detected, a predetermined data pattern is generated to output in place of the block data of interest, which enables an application for reproducing the readout data to identify the readout error. Accordingly, the application can identify the error, which enables to prevent a failure in executing normal operation of the application, and also to prevent a hung up of the system. Further, because the application can identify the error, it becomes possible to continue the reproduction processing using a more preferable reproduction method, instead of reproducing using the pseudo data. Thus AV data reproduction performance can be improved.

According to the present invention, there is disclosed an feature of data reproduction system which includes; storage apparatus for reading out data stored in the storage medium and, when the readout error is detected, generating a predetermined data pattern to transfer in place of the block data of interest; and a processor for performing reproduction processing against the data from the storage apparatus. Here, the processor identifies an error from the predetermined data pattern and continues reproduction processing.

In this feature, when a readout error is detected, a predetermined data pattern is generated to output in place of the block data of interest, which enables an application for reproducing the readout data to identify the readout error. Accordingly, the application can identify the error, which enables to prevent a failure in executing normal operation of the application, and also to prevent a hung up of the system. Further, because the application can identify the error, it becomes possible to continue the reproduction processing using a more preferable reproduction method, instead of reproducing using the pseudo data. Thus AV data reproduction performance can be improved.

According to the present invention, there is disclosed an feature of a storage medium which is provided with programs including; a program for determining whether a readout error occurs in the data being read out from the storage medium; and a program for generating, when the readout error occurs, a predetermined data pattern which enables an application for reproducing the readout data to identify the readout error, to substitute for the block data of interest.

According to the present invention, there is disclosed a feature of a data reproduction method. The method includes the steps of; reading out the plurality of blocks in the storage medium in response to a read command and transferring data after performing an error check; performing reproduction processing against the transferred data; on identifying an error in the transferred data, determining whether a retry is to be executed against the error block of interest in the storage medium; and in case of determining the retry to be executed, retrying against the error block in the storage medium.

In this feature, on detection of an error in a transfer data, whether or not a retry is to be executed is determined. This enables to control retry execution in the event of data error. More specifically, it becomes possible to prevent a useless retry execution in case only data reproduction is to be performed. Meanwhile, it becomes also possible to execute the retry execution in case the data is to be stored into another storage medium so as to obtain a faultless data.

In another feature of the data reproduction method according to the present invention, the aforementioned determination step further includes the step of identifying the error check condition after the read command execution is completed. This enables to identify an error block, facilitating to obtain a faultless data by executing a retry.

In another feature of the data reproduction method according to the present invention, the aforementioned transfer step further includes the step of transferring a data for indicating an error on behalf of the data block being read out and also transferring the block address encountering the error when an error is detected in the read block by means of the error check.

This enables to identify an error block, facilitating to obtain a faultless data by executing a retry.

According to the present invention, there is disclosed a data reproduction system which includes; a storage apparatus for reading out the plurality of blocks in the storage medium in response to a read command and transferring data after performing an error check; and a processing unit for performing reproduction processing against the transferred data. Here, on identifying an error in the transferred data, the processing unit determines whether a retry is to be executed against the error block of interest and instructs the storage apparatus to retry against the error block in the storage medium in case of determining the retry to be executed.

In this feature, on detection of an error in a transfer data, whether or not a retry is to be executed is determined. This enables to control retry execution in the event of data error. More specifically, it becomes possible to prevent a useless retry execution in case only data reproduction is to be performed. Meanwhile, it becomes also possible to execute the retry execution in case the data is to be stored into another storage medium so as to obtain a faultless data.

Further scopes and features of the present invention will become more apparent by the following description of the features with the accompanied drawings.

DETAILED DESCRIPTION OF THE PREFERRED EMBODIMENTS

T he preferred embodiment of the present invention is described referring to the charts and drawings, wherein like numerals or symbols refer to like parts.

Hereinafter, the preferred embodiments of an AV data processing system and AV data processing are separately explained in order.

[Processing System]

Figure 1:
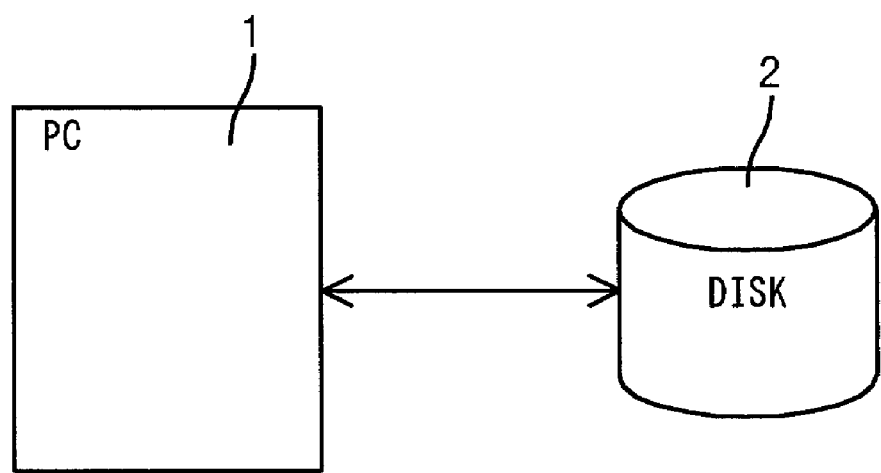
FIG. 1 shows a block diagram of an feature of a reproduction system according to the present invention.
Figure 2:
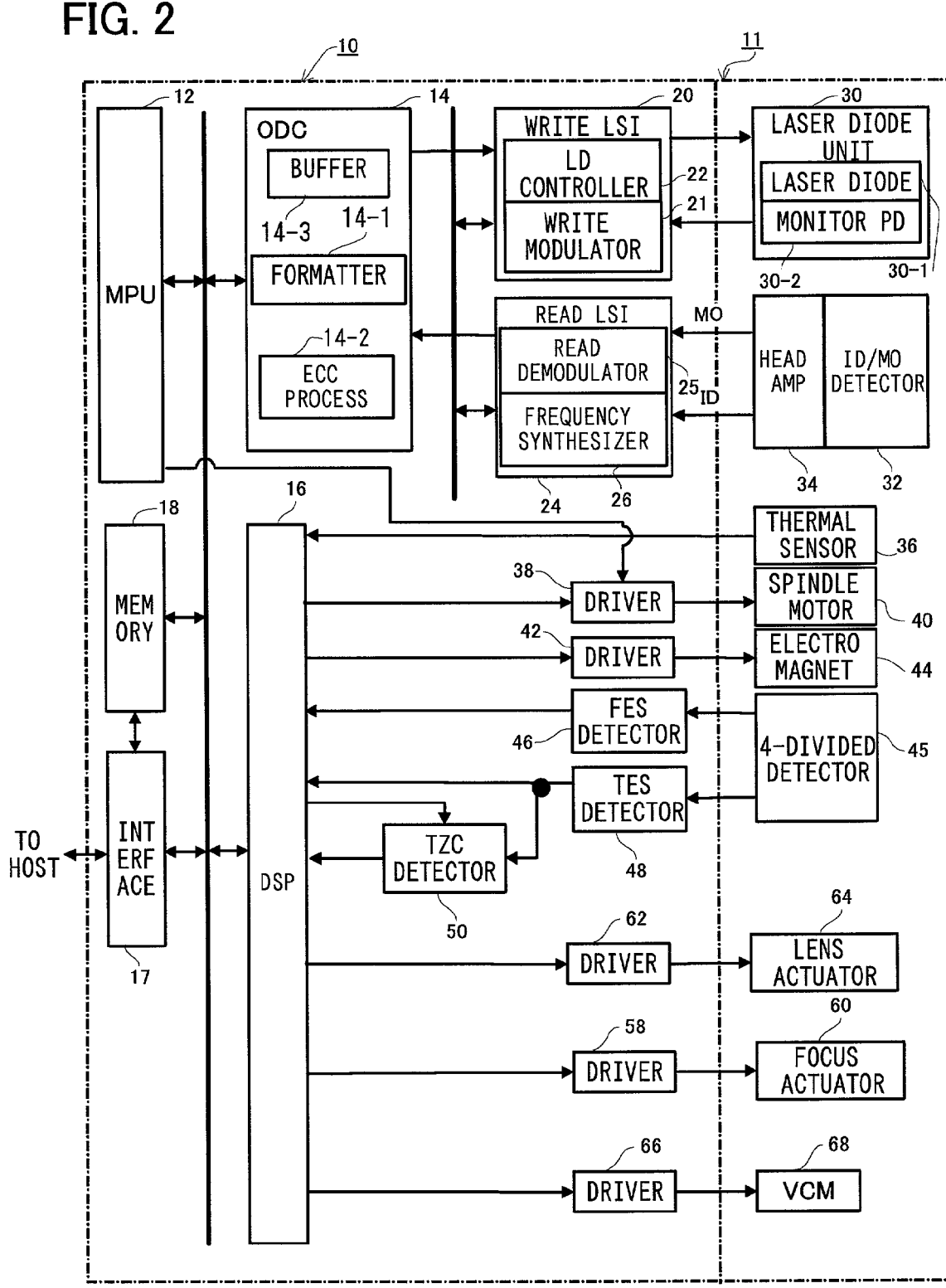
FIG. 2 shows a block diagram of the storage apparatus shown in FIG. 1.
Figure 3:
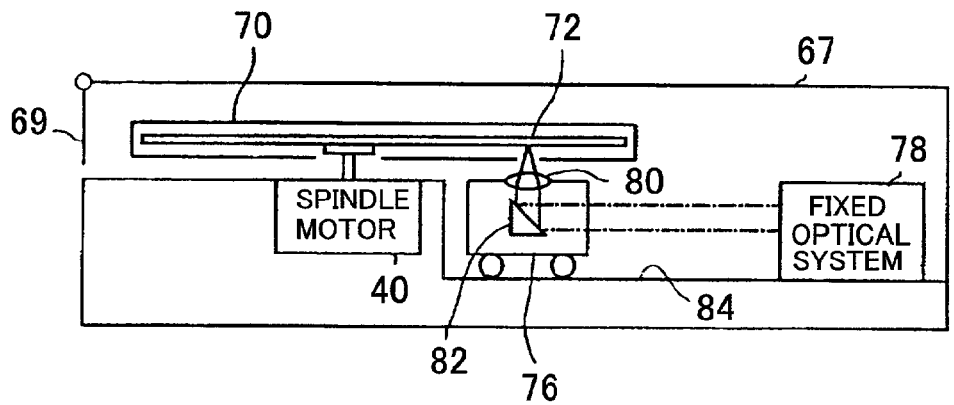
FIG. 3 shows a configuration diagram of the disk drive unit shown in FIG. 2.
Figure 4:
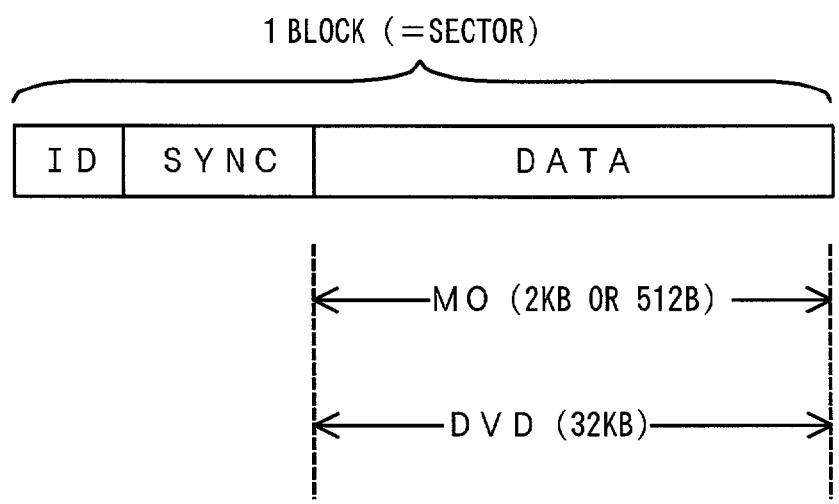
FIG. 4 shows a record format diagram of the disk shown in FIG. 3.

FIG. 1 is a block diagram of an feature of the audio/visual data processing system according to the present invention. FIG. 2 is a block diagram of the storage apparatus shown in FIG. 1. FIG. 3 is a configuration diagram of the optical disk drive unit shown in FIG. 2. Also, FIG. 4 is a record format diagram of an optical disk.

As shown in FIG. 1, a host 1 such as a personal computer is connected with storage apparatus 2 such as a magneto-optical disk unit. The host 1 is provided with an AV data processing function such as MPEG. The host 1 transfers the compressed AV data to the storage apparatus 2 to store into a storage medium of storage apparatus 2. Also, the host 1 reads out AV data stored in the storage medium of the storage apparatus 2 and performs reproduction process using an MPEG decoder. The reproduced images are displayed onto a display unit in the host 1, and also an audio device reproduces voices.

As storage apparatus 2, optical disk unit (DVD-RAM, DVD-ROM, CD, CD-R, or MO), a magnetic disk unit, semiconductor memory apparatus, etc. are applicable. In the example shown in FIG. 2, a magneto-optical disk unit is used as storage apparatus 2.

As shown in FIG. 2, the magneto-optical disk unit is provided with a control unit 10 and a disk drive 11. MPU (microprocessor unit) 12 performs overall control of the magneto-optical disk unit. An interface 17 transfers commands and data to/from the host (not shown). An optical disk controller (ODC) 14 performs necessary functions for reading/writing data from/to the magneto-optical disk unit (MO). A digital signal processor (DSP) 16 controls functional portions, which will be mentioned later, according to an instruction from the MPU 12. A memory (RAM) 18 is commonly used by the MPU 12, the ODC 14 and the interface 17, for storing write data, read data, etc.

In ODC 14, there are provided a buffer memory 14-3, a formatter 14-1 and an error correction code (ECC) processor 14-2. In case of a write access, the formatter 14-1 divides NRZ write data into each sector in the optical disk to generate a record format. The ECC processor 14-2 generates an ECC for each sector data and attaches the ECC to the sector data. Further, when necessary, the ECC processor 14-2 generates a cyclic redundancy check (CRC) code and attaches CRC to the sector data. In addition, the ECC processor 14-2 converts a sector data to which an ECC has been attached into a 1-7 run-length limited code (RLL code).

In case of a read access, a sector data having been read out by a read LSI 24, which will be described later, is stored into the buffer memory 14-3. Thereafter the ECC processor 14-2 inversely converts 1-7 RLL code data of the sector data having been read and inspects the CRC. The ECC processor 14-2 then performs error detection as well as error correction using the ECC code. When detecting an error which is unable to correct, the ECC processor 14-2 notifies MPU 12 of this detection condition. Moreover, the formatter 14-1 combines NRZ data on a sector by sector basis to configure an NRZ read data stream. This data stream is transferred to the host through the memory 18 and the interface 17.

Write LSI circuit 20 includes a write modulator 21 and a laser diode control circuit 22. The write modulator 21 modulates write data into data having a data format of either a pit position modulation (PPM) recording (or a mark recording) or a pulse width modulation (PWM) recording (or an edge recording) depending on the types of magneto-optical disks. Based on this modulated data, the laser diode control circuit 22 controls a laser diode unit 30 in an optical unit of drive 11. The laser diode unit 30 provided in the drive 11 includes a laser diode 30-1 for irradiating laser light onto the magneto-optical disk, and a detector 30-2 for monitoring.

Read LSI circuit 24 is provided with a read demodulator 25 having an AGC (automatic gain control) circuit, a filter, a sector mark detection circuit, and a frequency synthesizer 26. The read demodulator 25 detects a sector mark in an input ID signal, generates a read clock from a synchronization signal SYNC (refer to FIG. 4) in the MO signal, generates the read data, and demodulates either PPM data or PWM data so as to reproduce the original NRZ data. The read demodulator 25 cannot demodulate the read data when the synchronization signal in the MO signal cannot be read out. In such a case, a readout error is reported to MPU 12.

An ID/MO detector 32 on the optical head of drive 11 detects a return light from the magneto-optical disk, and inputs the ID/MO signal into the read LSI circuit 24 through a head amplifier 34. The frequency synthesizer 26 generates a clock having a frequency corresponding to the magneto-optical disk zone, which is used as a read clock.

A thermal sensor 36 provided in drive 11 detects drive temperature. The detected temperature is supplied to MPU 12 through DSP 16. Based on this detected temperature, MPU 12 optimally controls each emission power of the laser diode control circuit 22 for read, write or erase operation.

A spindle motor 40 rotates the magneto-optical disk. MPU 12 controls start, stop or constant rotation of the spindle motor 40 through a driver 38. The driver (drive circuit) 38 is constituted by a PLL circuit. When either recording or erasing an electro, magnet 44 supplies an external magnetic field to the loaded magneto-optical disk. DSP 16 controls the electro magnet 44 through a driver 42 according to an order from MPU 12. Four-division detector 45 detects a return light from the magneto-optical disk.

A FES detection circuit 46 generates a focus error signal (FES) from the output of the four-division detector 45, and inputs to DSP 16. DSP 16 generates a focus drive signal using a focus servo loop, and controls a focus actuator 60 through a driver 58. The focus actuator 60 drives an objective lens of the optical head in a focusing direction. Thus a focus servo control is carried out. Namely, DSP 16 performs feedback-control of the focus actuator 60 to minimize the focus error signal, so as to focus a light beam right on the plane of the record medium.

A TES detection circuit 48 generates a track error signal (TES) from the output of four-division detector 45 and inputs to DSP 16. The TES is also input to a track zero cross (TZC) detection circuit 50. The TZC detection circuit 50 generates a TZC pulse to input to DSP 16.

Based on this TES, DSP 16 generates a track drive signal using a track servo loop, to control a track (lens) actuator 64 through a driver 62. The track actuator 64 drives the objective lens of the optical head in a track direction. Thus a track servo control is carried out. Namely, DSP 16 performs feedback-control of the track actuator 64 so as to position the light beam to the center of a track.

Further, based on TZC, DSP 16 calculates a seek distance to seek-control a voice coil motor (VCM) 68 through a driver 66. The VCM 68 moves the optical head.

FIG. 3 is a configuration diagram of magneto-optical disk drive 11 shown in FIG. 2. As shown in FIG. 3, the aforementioned spindle motor 40 is provided in a housing 67. A magneto-optical disk cartridge 70 is inserted from an inlet 69. Magneto-optical disk 72 in the cartridge 70 is rotated by the spindle motor 40.

The optical head is constituted by a carriage 76 and a fixed optical system 78. By means of VCM 68 (refer to FIG. 2), the carriage 76 moves in a transversal direction of the tracks of the magneto-optical disk 72 along a rail 84. The carriage 76 includes an objective lens 80, a prism 82 for direction alteration, the focus actuator 60, the track actuator 64, etc. The fixed optical system 78 includes the aforementioned laser diode unit 30, the ID/MO detector 32 and the four-division detector 45 (refer to FIG. 2). The record format of the magneto-optical disk 72 is constituted by ID, synchronization signal SYNC and data DATA in a single sector (namely, a single block). The ID has normally been produced as a pit in a magneto-optical disk track, while synchronization signal SYNC and data DATA are written. The data length of this DATA is either 512 bytes or 2K bytes in case of the magneto-optical disk, while 32K bytes in case of DVD.

In this magneto-optical disk unit, as mentioned earlier, a data cannot be demodulated when synchronization signal SYNC cannot be detected. More specifically, after ID is detected, if the synchronization signal SYNC is not detected by the read demodulator 25, the block concerned cannot be demodulated. Therefore, when the synchronization signal SYNC is not detected after ID is detected, readout failure is reported to MPU 12.

When demodulating read data is successfully completed in the read demodulator 25, the readout data in the buffer memory 14-3 is ECC-checked and possibly corrected in the ECC processor 14-2. When the ECC processor 14-2 detects an error unable to correct, a data error is reported to MPU 12.

As such storage apparatus, DVD unit, CD unit, semiconductor memory, VCR, etc. are available in addition to magneto-optical disk unit. Also it is possible to use a read-only storage medium in addition to a storage medium able to read and write.

[Audio/Visual Data Processing]

Figure 5:
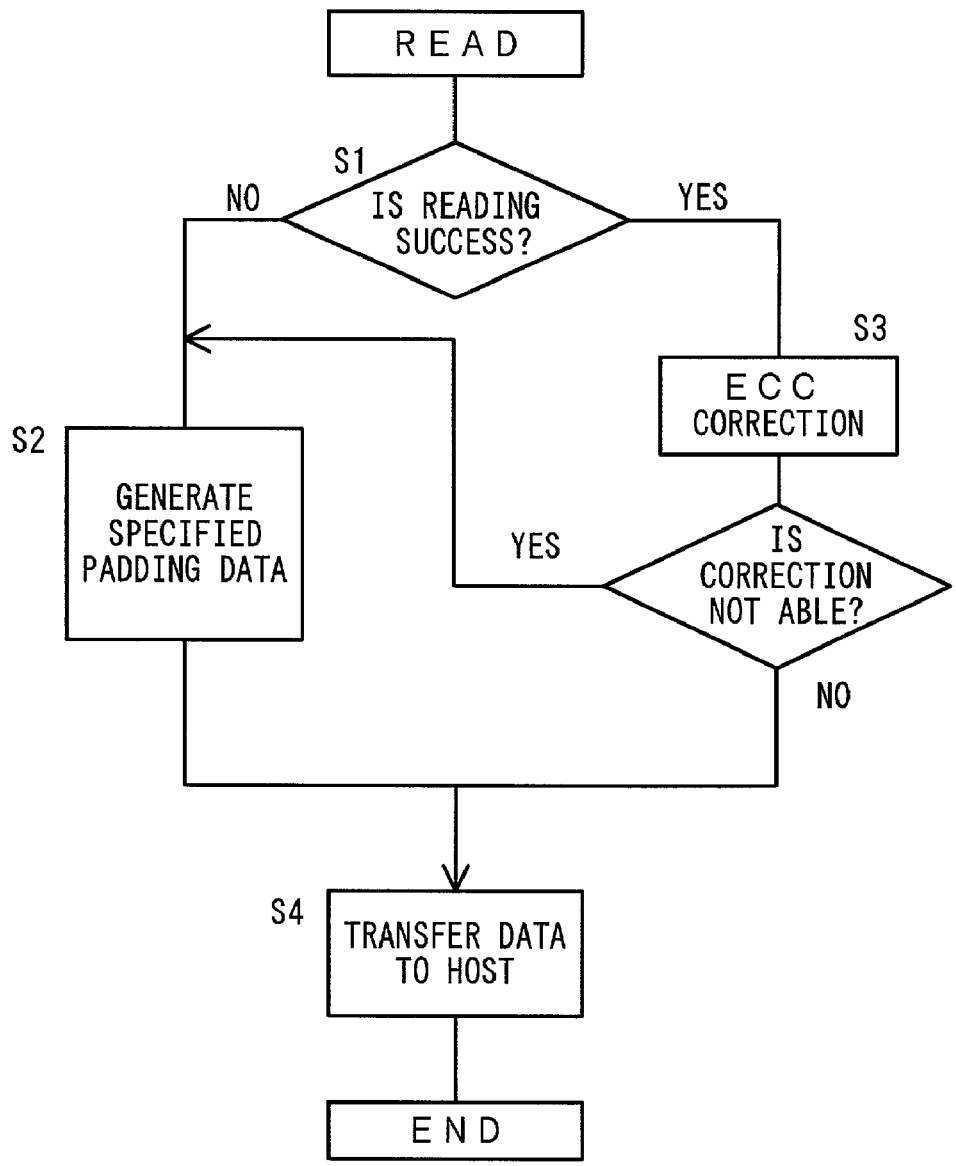
FIG. 5 shows a read processing flowchart of the storage apparatus shown in FIG. 2.

FIG. 5 is a read processing flowchart of a drive, in which the read processing in MPU 12 is illustrated.

(S1) When MPU 12 in the drive 2 receives a read command from the host 1, MPU 12 executes this routine. When reading audio/visual data, the host 1 transfers the read block numbers of respective audio/visual data blocks to the drive 2 together with the read command. This initiates MPU 12 to start read operation. In the read operation, first, a light beam is placed on a track of a top block of a specified block, and then the top block is searched with the aforementioned sector ID and the data of the block concerned is read.

An MO signal having been read in is demodulated in the read demodulator 25, as explained earlier. At this time, when detection of synchronization signal SYNC is failed, the read demodulator 25 notifies MPU 12 of the detection failure. MPU 12 determines whether or not the read operation has succeeded.

(S2) When receiving the notification indicating that read operation failed, MPU 12 writes a predetermined data pattern into the buffer memory 14-3 for the block data. As for this data pattern, any pattern is applicable if only the host 1 can identify the error, as will be explained below. For example, a padding data such as '0x00', '0xFF', or the like, can be applied. Further, it is also applicable to use a predetermined MPEG pattern which can be handled by the application in the host 1.

(S3) Meanwhile, if no failure notification is received, the read is considered to have completed successfully. The read data is transferred from the read demodulator 25 to the buffer memory 14-3. The ECC processor 14-2 checks the ECC of the read data in the buffer memory 14-2, and corrects the ECC when necessary. When the error correction is not possible, the ECC processor 14-2 notifies MPU 12 of the occurrence of data error. On reception of the data error notification, MPU 12 performs the processing of step S2.

(S4) Under the control of MPU 12, block data in the buffer memory 14-3 is transferred to the host 1 by the interface 17 through RAM 18. MPU 12 performs read processing of the specified block, and completes the processing.

Figure 7:
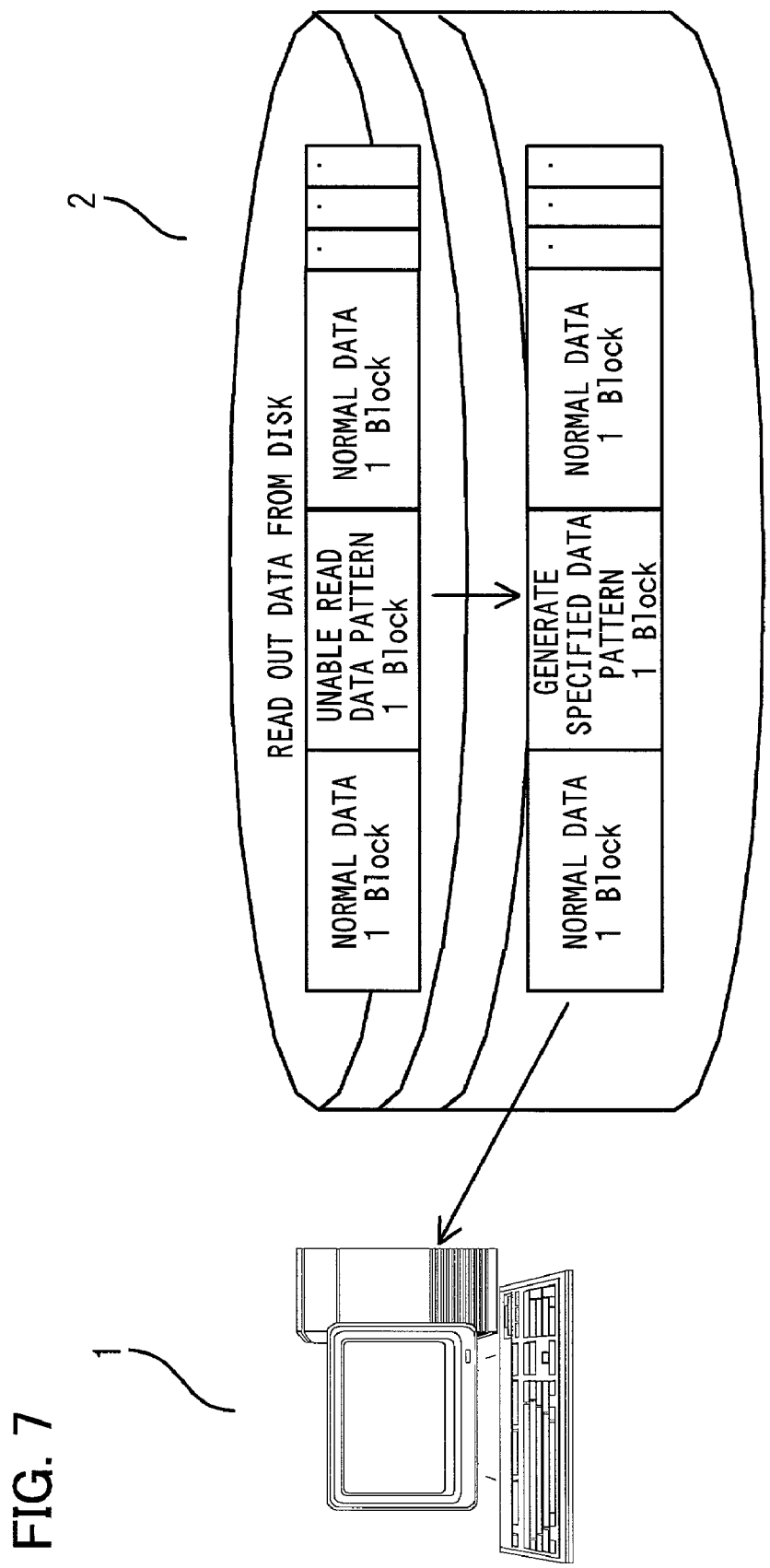
FIG. 7 shows an explanation diagram of reproduction processing according to an embodiment of the present invention.

FIG. 7 shows an explanation diagram of data for transfer. Audio/visual data is constituted by a plurality of blocks because the data has a large amount in quantity. Data is read out from the drive 2 on a block-by-block basis. At this time, as mentioned earlier, a predetermined pattern data is generated for a block either having been unsuccessful in reading, or having a data error while reading. In such a manner, the data can be transferred continuously even the audio/visual data has a plurality of blocks.

Figure 6:
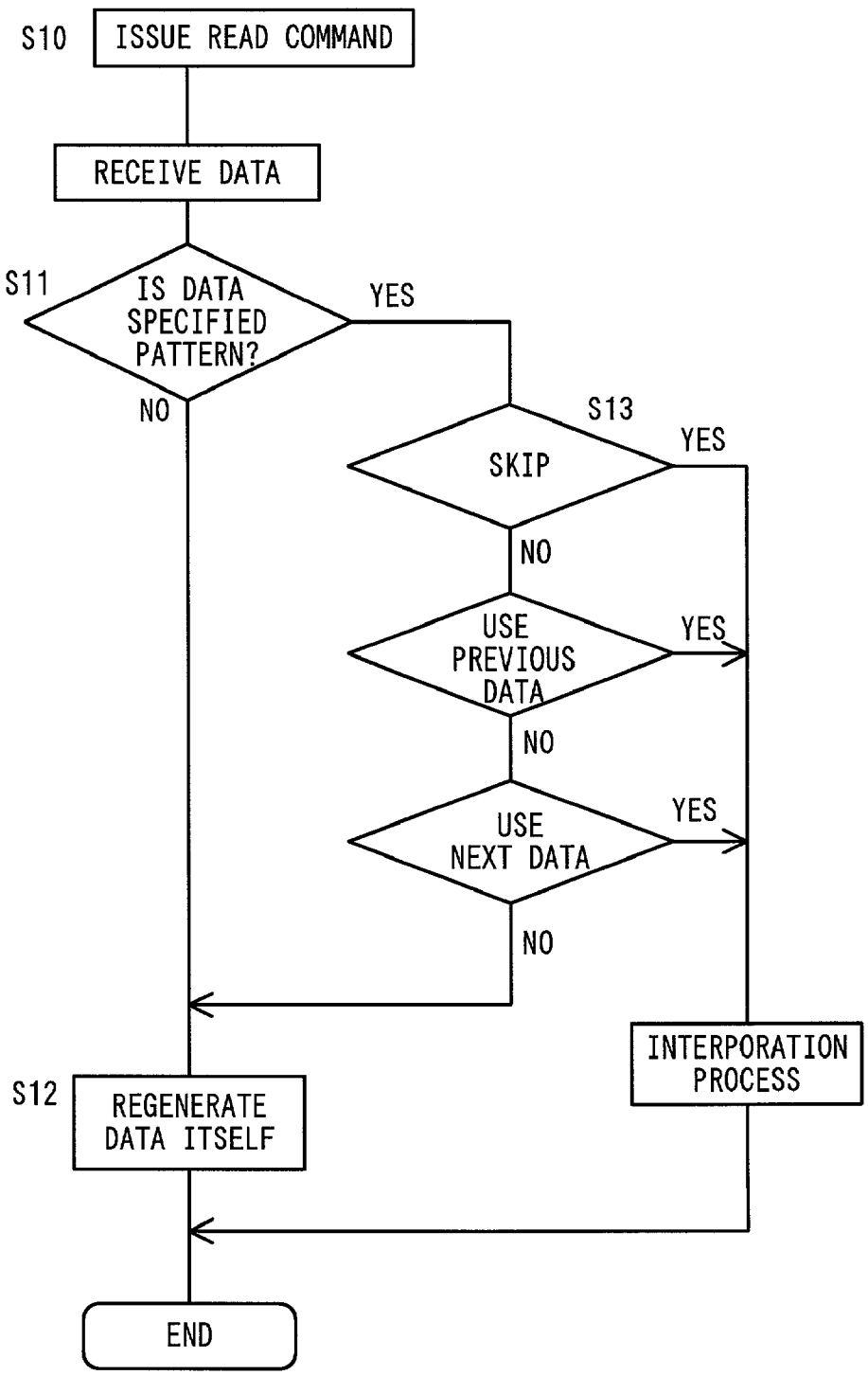
FIG. 6 shows a flowchart of data reproduction processing in the host shown in FIG. 1.

FIG. 6 shows a flowchart of audio/visual data processing provided in the application in the host 1.

(S10) The host 1 issues an audio/visual data read command, and receives a read data from the drive 2.

(S11) The host 1 determines whether the received block is constituted by the specified pattern.

(S12) If the received block is not constituted by the specified pattern, the block is reproduced without any modification. For example, when an MPEG decoding function is incorporated by software, an MPEG decode processing is performed. Otherwise, when the MPEG decoder is incorporated by hardware, the block data is transferred to the decoder of interest. Thereafter the data is output to a display unit, or an audio unit.

(S13) On the other hand, if the received block data is constituted by the specified pattern, the host 1 performs a specified reproduction processing against the error data. In this feature, it is possible to specify either of the following three processing method for the reproduction processing against error data: skip; interpolate data using the data in the preceding block; or interpolate data using the data in the succeeding block.

In case skip is specified, the host 1 neglects this block data, to omit the reproduction processing. Continuity of the audio/visual data output is thus interrupted. In case interpolation by the data in the preceding block is specified, the host 1 reproduces using the preceding block data. Further, in case interpolation by the data in the succeeding block is specified, the host 1 reproduces using the succeeding block data for the block data of interest. In case no processing method is specified, the reproduction processing is performed based on step S12 without any modification.

In such a manner, it becomes possible for the application in the host 1 to identify an error in block data. Accordingly it becomes possible to avoid disabled application execution or a hung up. Further, by identifying the error, it becomes possible to continue optimal audio/visual reproduction.

[Other Audio/Visual Data Processing]

Figure 8:
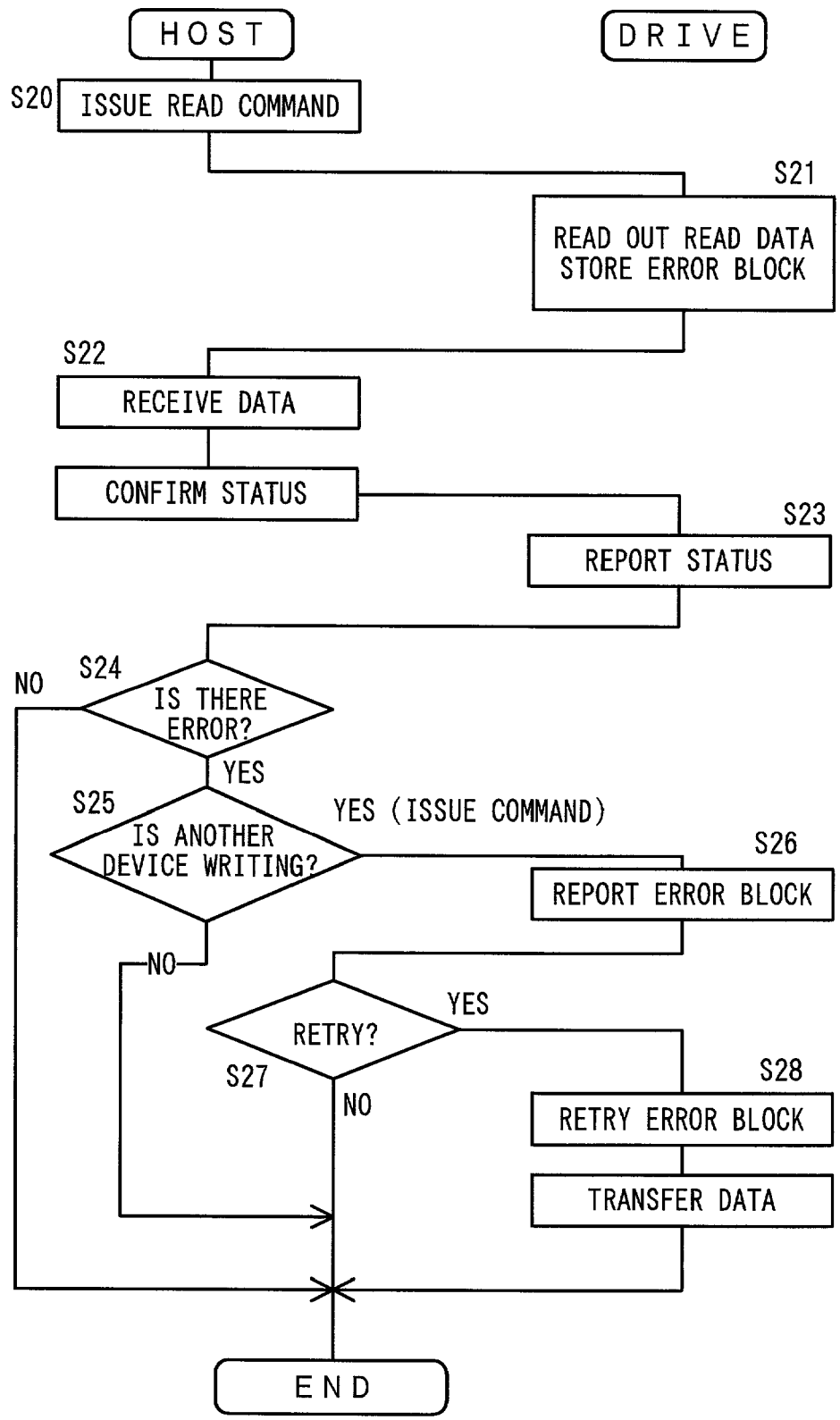
FIG. 8 shows a reproduction processing flowchart according to another embodiment of the present invention.
Figure 9:
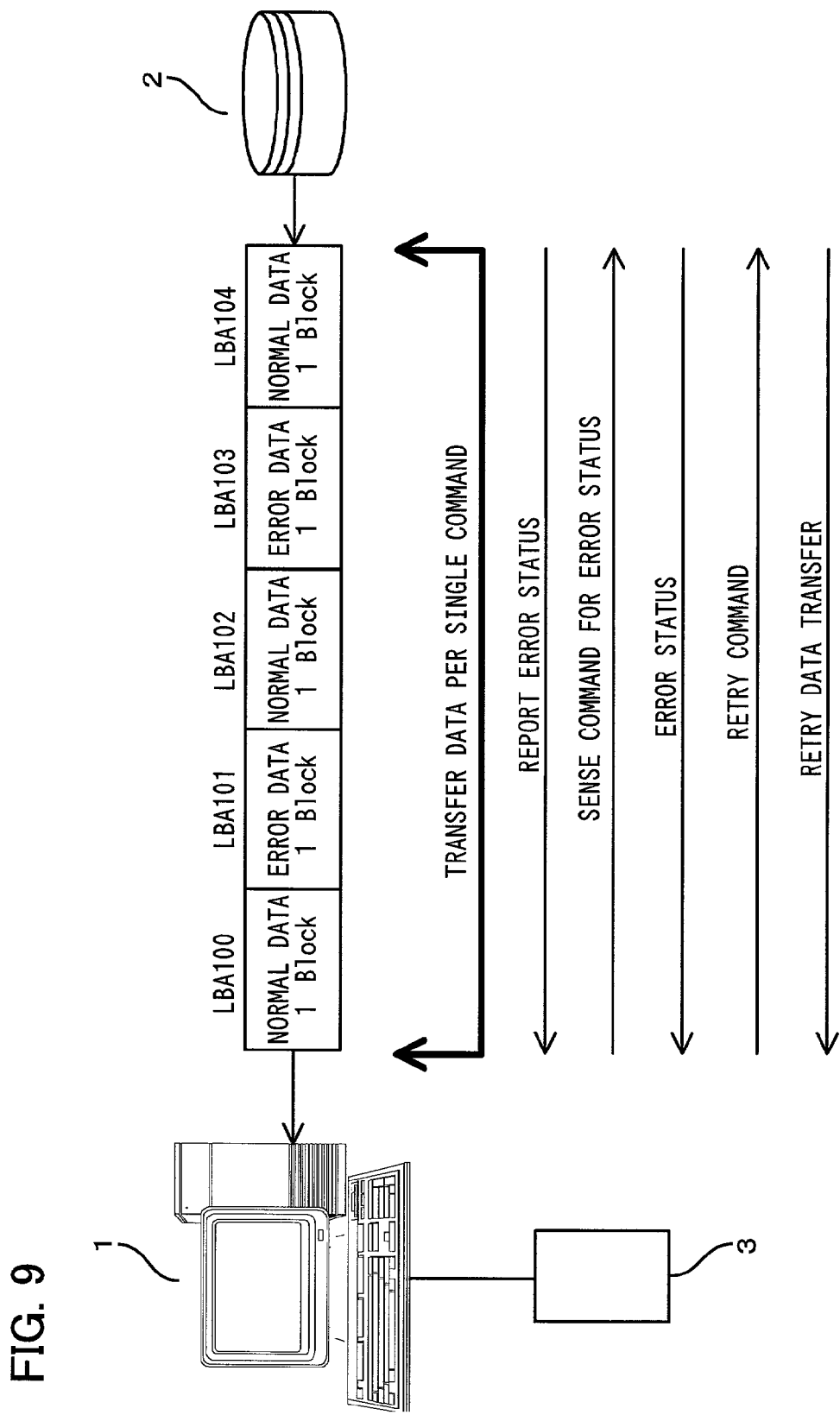
FIG. 9 shows an operation explanation diagram of the processing shown in FIG. 8.

FIG. 8 shows another flowchart of the audio/visual data processing according to the present invention. FIG. 9 shows an operation explanation diagram thereof. Now the processing will be described hereafter referring to FIG. 8.

(S20) The host 1 issues a read command to the drive 2.

(S21) In response to the read command, the drive 2 reads the specified block data to transfer to the host 1. At this time, it may also be possible to transfer an error data for the error block, as shown in FIG. 9, or otherwise to transfer a specified pattern data for the error block, as shown in FIG. 7 illustrated before. The drive 2 stores the error block number, and the number of bytes.

(S22) The host 1 either reproduces the received data block or writes the data block into other storage medium (refer to FIG. 9). On reception of entire data blocks for the command, the host 1 issues a sense command to the drive 2.

(S23) The drive 2 then executes the read command and reports the execution status to the host 1. For example, error is reported when an error occurs during reading.

(S24) The host 1 checks from the received status whether an error has occurred. If there is no error the procedure is completed.

(S25) When there is an error, the host 1 checks whether the received data of interest is currently being written into another storage medium (for example, a semiconductor memory). When the data is not being written into the other storage medium, the host 1 simply completes the procedure because the audio/visual data is being reproduced only and therefore no retry is required.

(S26) On the other hand, when the data is currently being written into the other storage medium 3, it is not proper to leave the error data block as it is. Therefore, the host 1 issues a status read command to the drive 2. In response to this command, the drive 2 reports the error block number and number of error bytes to the host 1.

(S27) The host 1 determines from the number of error blocks whether or not a retry is to be performed. In respect of audio/visual data, a retry is not necessary if the number of error blocks is small. In such a case the procedure is completed.

(S28) When the host 1 determines that a retry is needed, the host 1 transmits to the drive 2 a retry command as well as the retry block. Thereby, the drive re-reads the data of the specified block and transfers it to the host 1. The host 1 re-writes the error data on the storage medium by this block data.

Thus the host 1 instructs a retry when a faultless clean data is necessary, and obtains the faultless data. Accordingly, an unnecessary retry can be prevented. Further, because audio/visual data is transferred continuously, the host 1 obtains the error contents after the transfer is completed. Accordingly, a retry block can be identified even if audio/visual data is transferred continuously.

[Other Audio/Visual Data Processing]

Figure 10:
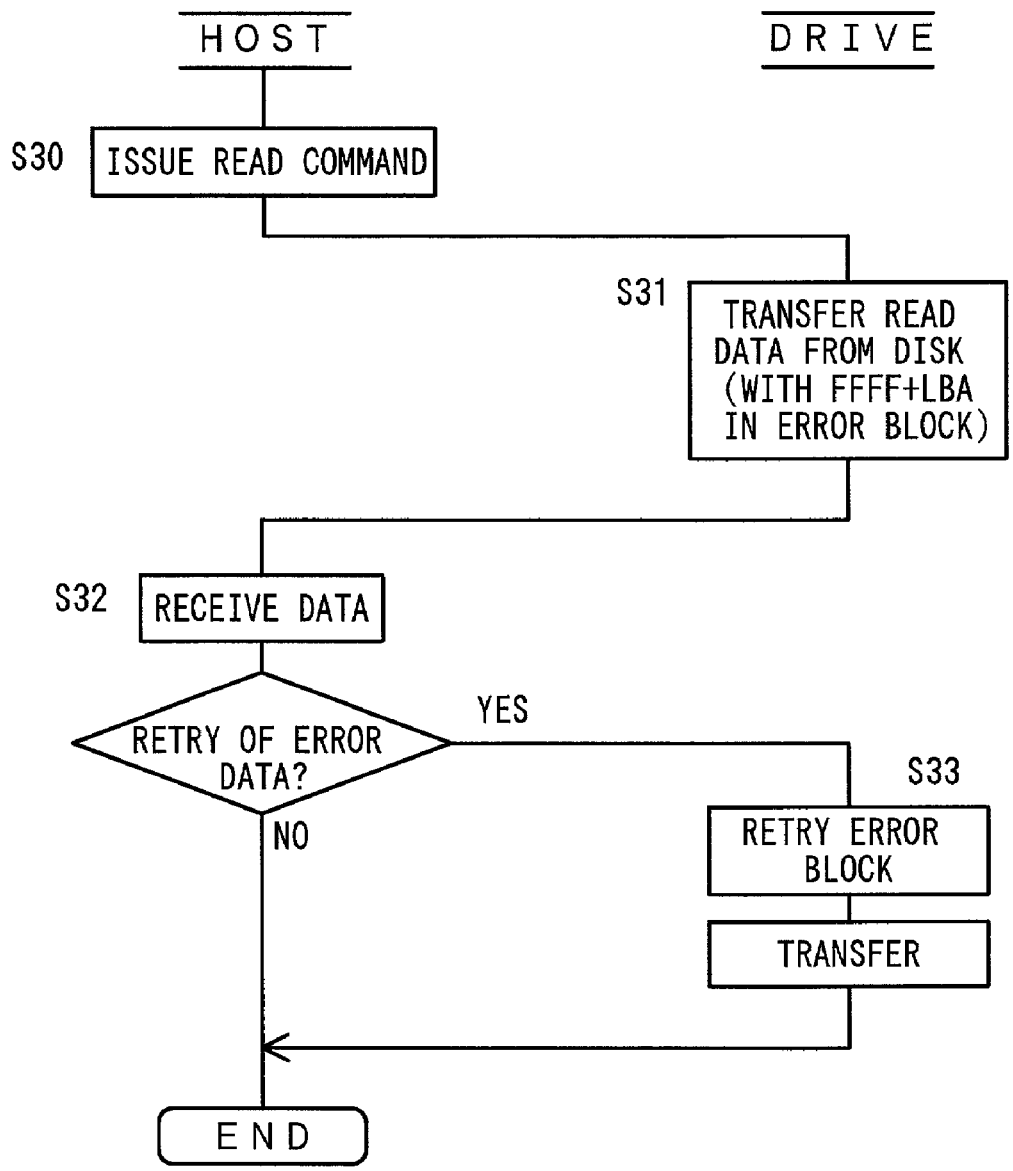
FIG. 10 shows a reproduction processing flowchart according to another embodiment of the present invention.
Figure 11:
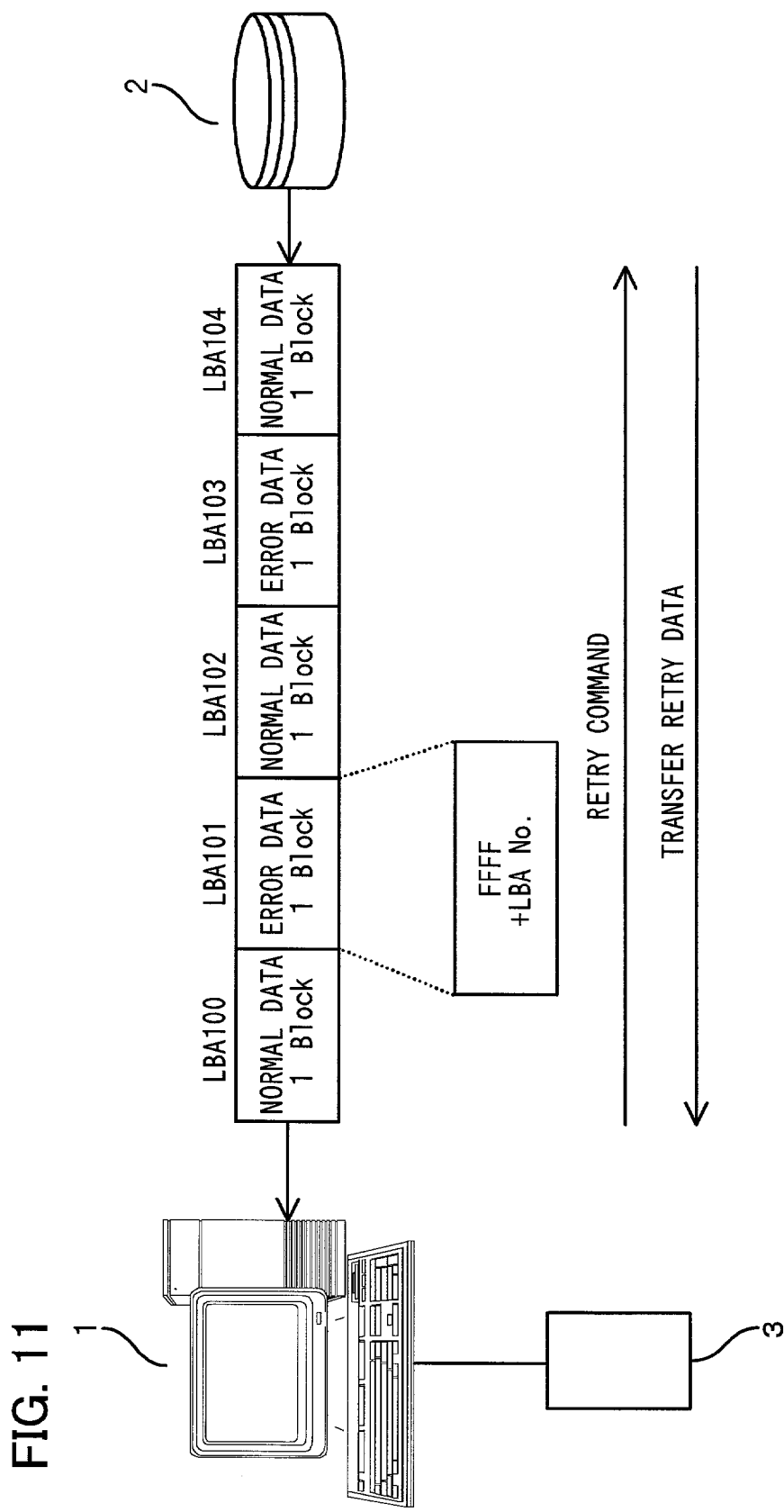
FIG. 11 shows an operation explanation diagram of the processing shown in FIG. 10.

FIG. 10 shows a flowchart of other audio/visual data processing according to the present invention. FIG. 11 is an explanation diagram thereof. The processing will be explained hereafter referring to FIG. 10.

(S30) The host 1 issues a read command to the drive 2.

(S31) In response to this, the drive 2 reads the specified block data, to transfer to the host 1. At this time, in regard to the error block, a data indicating error (for example, 'FFFF') and the block number LBA is transferred, as shown in FIG. 11.

(S32) The host 1 reproduces the received data block, or writes the data into another storage medium 3 (refer to FIG. 11). On reception of entire data blocks for the command, the host 1 checks whether the data is currently being written into another storage medium (for example, a semiconductor memory). When the data is not being written into the other storage medium, the host 1 completes the procedure because the audio/visual data is being reproduced only and therefore no retry is required.

(S33) On the other hand, when the data is currently being written into the other storage medium 3, it is not proper to leave the error data block as it is. Therefore, the host 1 obtains the error block address from the aforementioned error data block, to transfer a retry command as well as the retry block address to the drive 2. Accordingly, the drive 2 reads the data of the specified block again and transfers to the host 1. The host 1 overwrites the error data in the storage medium with the transferred block data.

In this case, because the error indication is written into each error block, the host 1 skips to write and reproduce the error data when the error block data is received. In such a manner, the host 1 orders to perform a retry when a faultless clean data is necessary, and obtains the faultless data. Thus an unnecessary retry can be prevented. Accordingly, a retry block can be identified even if audio/visual data is transferred continuously.

In addition to the aforementioned features, the following modifications can be applied according to the present invention.

(1) In the aforementioned features, a system having a host and a drive is explained. It may also be possible to apply to a configuration having a processing circuit and a drive.

(2) Also, with regard to a data block, the aforementioned method can apply to a data block having other configuration.

The foregoing description of the features is not intended to limit the invention to the particular details of the examples illustrated. Any suitable modification and equivalents may be resorted to the scope of the invention.

APPLICATION FIELD IN THE INDUSTRY

According to the present invention, the following effects can be obtained.

(1) In case it is not possible to readout from a storage medium, a data having a predetermined pattern is transferred. This enables to transfer audio/visual data continuously. The error can be identified by an application provided for reproducing data. Accordingly, it becomes possible to avoid occurrence of application falling in not executable condition or a hung up condition.

(2) Even when an error data is transferred, it is determined whether or not a retry is needed. This can prevent an unnecessary retry in reproducing audio/visual data or the like.

What is claimed is:

1. A read processing method of a storage medium for reading out data in a plurality of blocks of the storage medium, comprising the steps of:

reading out data stored in the storage medium;

determining whether a readout error occurs during said readout;

generating a predetermined data pattern so that an application for reproducing said readout data can identify said readout error and perform reproduction processing against said readout error, said predetermined data being used for judging what kind of said reproduction processing is performed; and outputting said predetermined data pattern in place of a block data of interest when said readout error occurs in a plurality of readout blocks, wherein said determination step of error occurrence comprises the steps of:

determining whether said data readout is successfully completed;

checking whether there is an error in said readout data;

error correcting said readout data when there is said error in said checking; and identifying said readout error when said error correcting is not possible.

2. A data reproduction method for reading out data stored in a storage medium and performing reproduction processing, comprising the steps of:

reading out data stored in the storage medium, generating a predetermined data pattern, and transferring said predetermined data pattern in place of a block data of interest when a readout error occurs in a plurality of readout blocks; and performing reproduction processing against said transferred data, wherein said reproduction processing step identifies an error from said predetermined data pattern and continues said reproduction processing including reproduction processing against said identified error, said predetermined data pattern being used for judging what kind of said reproduction processing is performed, and wherein said reading out step further comprises the steps of:

determining whether data readout is successfully completed;

checking whether there is an error in readout data;

error correcting said readout data when there is said error in said checking step; and identifying said occurrence of said readout error when said error correcting is not possible.

3. A storage apparatus for reading out data in a plurality of blocks in a storage medium, comprising:

a readout means for reading out data in the storage medium; and a processing means for determining whether a readout error occurs during readout and, when said readout error is detected, generating a predetermined data pattern which enables an application for reproducing readout data to identify said readout error and perform reproduction processing against said readout error, and outputting said predetermined data pattern in place of a block data of interest in a plurality of readout blocks, said predetermined data pattern being used for judging what kind of said reproduction processing is performed, wherein said processing means determines whether data readout is successfully completed, checks whether there is an error in said readout data, error corrects said readout data when there is said error in checking, and identifies said readout error when said error correcting is not possible.

4. A data reproduction system for reading out data stored in a storage medium and performing reproduction processing, comprising:

a storage apparatus for reading out data stored in the storage medium and, when a readout error is detected, generating a predetermined data pattern and transferring said predetermined data pattern in place of a block data of interest in a plurality of readout blocks, said predetermined data pattern being used for judging what kind of said reproduction processing is performed; and a processor for performing reproduction processing against said data from said storage apparatus, wherein said processor identifies said error from said predetermined data pattern, and continues said reproduction processing including reproduction processing against said identified error, and wherein said storage apparatus determines whether data readout is successfully completed, checks whether there is an error in readout data, error corrects said readout data when there is said error in checking, and identifies said readout error when said error correcting is not possible.

5. A storage medium storing a program for reading out data in a plurality of blocks stored in a storage medium, the program comprising:

a program for determining whether a readout error occurs in the data being read out from the storage medium;

a program for generating, when said readout error occurs, a predetermined data pattern which enables an application for reproducing readout data to identify said error and perform reproduction processing against said readout error, and substituting said predetermined data pattern for a block data of interest in a plurality of readout blocks, said predetermined data pattern being used for judging what kind of said reproduction processing is performed; and a program for determining whether data readout is successfully completed, checking whether there is said error in said readout data, error correcting said readout data when there is said error in checking, and identifying said readout error when said error correcting is not possible.

6. A data reproduction method for reading out data stored in a storage medium and performing reproduction processing, comprising the steps of:

reading out a plurality of blocks in the storage medium in response to a read command from a processor, and transferring said read data to said processor after performing an error check to said read data by a drive;

performing reproduction processing against transferred data in said processor;

determining whether a retry is to be executed against an error block of interest in the storage medium when identifying an error in said transferred data in said processor; and retrying against said error block in the storage medium in case of determining said retry to be executed by said processor, wherein the method further comprises:

a step of notifying of an error status from the drive to said processor when detecting said error of the data to identify said error by said drive;

a step of sending an error sense command from said processor to said drive after receiving notification of said error status; and a step of sensing and transferring contents of said detected error to said processor in order to determine said retry after a read command execution is completed by said processor.

7. A data reproduction method for reading out data stored in a first storage medium and performing reproduction processing, comprising the steps of:

reading out a plurality of blocks in the first storage medium in response to a read command from a processor, and transferring read data to the processor after performing an error check to the data by a drive;

performing reproduction processing against transferred data in said processor;

determining whether a retry is to be executed against an error block of interest in the storage medium when identifying an error in said transferred data and when said processor writes a received block into a second storage medium; and retrying against said error block in the first storage medium in case of determining said retry to be executed, wherein said transfer step comprises the step of:

transferring data for indicating an error on behalf of said error block being read out with a block address in a position of said error block in said plurality of read blocks on detection of said error in a read block by said error check.

8. A data reproduction system for reading out data stored in a storage medium and performing reproduction processing, comprising:

a storage means for reading out a plurality of blocks in the storage medium in response to a read command, and transferring read data after performing an error check to said read data; and a processing means for performing reproduction processing against said transferred data, wherein said processing means determines whether a retry is to be executed against an error block of interest in the storage medium when identifying an error in said transferred data, and instructs said storage means to retry against said error block in the storage medium in case of determining said retry to be executed, wherein said storage means notifies said processing means of an error status when detecting said error of the data to identify said error, said processing means sends an error sense command to said storage means after receiving notification of said error status, and said storage means senses and transfers to said processing means contents of said detected error to determine said retry after said read command execution is completed.

9. A data reproduction system for reading out data stored in a first storage medium and performing reproduction processing, comprising:

a storage means for reading out a plurality of blocks in the first storage medium in response to a read command, and transferring said read data after performing an error check to said read data; and a processing means for performing reproduction processing against said transferred data, wherein said processing means determines whether a retry is to be executed against an error block of interest in the first storage medium when identifying an error in said transferred data and writing said error block into a second storage medium, and instructs said storage means to retry against said error block in the first storage medium in case of determining said retry to be executed, wherein said storage means transfers data for indicating an error on behalf of said data block being read out, with a block address in a position of said data block in a plurality of data blocks on detection of said error in said read block by said error check.

* * * * *